United States Patent [19]

Shaw

[11] Patent Number: 5,326,470
[45] Date of Patent: Jul. 5, 1994

[54] NON-COMPRESSIVE LOADING OF A SCREEN BASKET FOR A PULP PRESSURE SCREENING APPARATUS

[75] Inventor: Steven F. Shaw, Foxborough, Mass.

[73] Assignee: Bird Escher Wyss Inc., Mansfield, Mass.

[21] Appl. No.: 986,757

[22] Filed: Dec. 8, 1992

[51] Int. Cl.$^5$ .............................................. B01D 33/067
[52] U.S. Cl. ...................................... 210/232; 210/396; 210/413
[58] Field of Search ............... 210/232, 339, 396, 413, 210/444, 450, 451, 452, 453, 497.01, 236, 397, 414; 162/272

[56] References Cited

U.S. PATENT DOCUMENTS

| | | |
|---|---|---|
| 3,123,558 | 3/1964 | Sullivan . |
| 3,381,820 | 5/1968 | Cecka . |
| 3,900,628 | 8/1975 | Stewart . |
| 4,634,521 | 1/1987 | Simola et al. . |
| 4,655,907 | 4/1987 | Ando . |
| 4,728,422 | 3/1988 | Bailey . |
| 4,818,402 | 4/1989 | Steiner et al. ........................ 210/413 |
| 4,880,540 | 11/1989 | Frejbarg ............................... 210/413 |
| 4,906,352 | 3/1990 | Nelson . |
| 4,968,366 | 11/1990 | Hukki et al. . |
| 4,997,575 | 3/1991 | Hilltsch .............................. 210/396 |
| 5,078,878 | 1/1992 | Charette . |
| 5,186,332 | 2/1993 | Hatton et al. ....................... 210/415 |

Primary Examiner—Robert A. Dawson
Assistant Examiner—W. L. Walker
Attorney, Agent, or Firm—Fish & Richardson

[57] ABSTRACT

A screen basket with greater structural integrity and fatigue resistance is mounted within a screening apparatus with substantially no axial compressive loading. The screen basket has end portions attached to a pair of support members with screen basket position engagement elements or fasteners to place the screen basket in a condition with no substantial axial compressive load. The screen basket, supported in this way, remains stationary when exposed to high hydrodynamic torsional forces and reduces the magnitude of deflections and bending stresses placed on the screen basket. The screen basket is preferably mounted in axial tension or with an axial neutral load.

21 Claims, 11 Drawing Sheets

NON-COMPRESSIVE LOADING OF A SCREEN BASKET FOR A PULP PRESSURE SCREENING APPARATUS

BACKGROUND OF THE INVENTION

This invention relates to screen baskets for screening apparatus as encountered in the pulp and paper industry. The screen baskets separate rejectable material from acceptable material when both are in a liquid suspension.

In the papermaking process, a screening apparatus is typically used to separate wood knots and other foreign material from a fluid pulp. A typical screening apparatus includes a housing within which a screen basket is mounted around a concentrically positioned rotor assembly. The screen basket is usually fabricated from a relatively thin metal plate material although bar or wire materials are also often used and when mounted in a screening apparatus, provides a barrier between a screening chamber and an accept chamber. Fluid pulp is introduced to the screening chamber by way of a feed inlet which is upstream of the screening chamber. The fluid pulp is introduced to either the inner or the outer portion of the screen basket depending on the type of screening apparatus used. Material which does not pass through the screen basket flows to an end of the screening chamber away from the feed inlet and is removed through a reject outlet. One type of screen basket has circular shaped openings sized to reject unwanted solids and may have support rings located along the length of the basket to provide additional mechanical support. Another type of screen basket has slots having lengths much greater than their widths for separating other types of materials and may have support rings located along the length of the screen basket to provide additional mechanical support.

The rotor assembly generally includes hydrofoils or a contoured drum mounted on a rotating shaft in close proximity to the screen basket to sweep past the openings of the screen basket. The hydrofoils or contoured drum may be positioned to sweep over the inner or the outer surface of the screen basket. The rotating hydrofoils or contoured drum generate hydrodynamic pulses in the radial direction with enough force and frequency to continuously remove any fiber plugs that occur in the screen basket openings. The localized flows caused by the hydrodynamic pulses are generally in a direction opposite to the flow of the fluid pulp provided to the screen basket under pressure.

End rings are generally attached to end portions of the screen basket for mounting the screen basket into the screening apparatus. The end rings are bolted to a stationary member to prevent the screen basket from rotating in response to the torsional forces generated by the rotating hydrofoils or drum. Such a mounting arrangement generally places the screen basket in an axially compressive loading condition.

SUMMARY OF THE INVENTION

In general, the invention features a screen basket mounted within a screening apparatus with substantially no axial compressive loading. The screen basket has opposite end portions, each end portion attached to a support member with a screen basket position engagement element. The attachment between the support members and end portions of the screen basket place the screen basket in a condition with no substantial axial compressive load. The screen basket, supported in this way, remains stationary when exposed to hydrodynamic torsional forces and reduces the magnitude of deflections and bending stresses placed on the screen basket.

In another aspect of the invention, a screen basket has end portions attached to a pair of support members so that the screen basket is placed in an axially tensioned condition to eliminate axial compressive loads. Axial compressive loads, particularly if substantial in magnitude, can be detrimental to the structural integrity of the screen basket.

The invention improves the structural integrity and fatigue resistance of the screen basket. The screen basket is subject to the hydrostatic pressure of the pulp and by the hydrodynamic forces generated by the rotation of pulsing elements, such as hydrofoils or a contoured surface of a drum for clearing the openings in the screen basket. These hydrostatic and hydrodynamic forces impart deflections and bending stresses to the relatively thin screen basket. Conventional attachment of the screen basket to the screening apparatus is generally in the form of compressive loading. Axial compressive forces provided by the mounting of the screen basket exacerbate the deflections and bending stresses associated with the transverse loads which over time can fatigue and buckle the screen basket. The invention substantially eliminates such compressive loading, and preferably places the screen basket in either a neutral or tensioned condition. Reducing the compressive loading on the mounted screen basket reduces the total deflections and bending stresses resulting from the radial and tangential transverse loads and the axial clamping load.

Moreover, reducing the axial compressive loading on the screen basket allows the use of screen baskets having thinner walls and screen baskets with slotted constructions of greater open screening area, both of which are generally more susceptible to localized buckling in environments with high hydrodynamic and hydrostatic forces. The geometry of the screen basket may be changed to improve the capacity and screening ability of the screening apparatus. Other methods of manufacturing of the screen basket may also be employed that are not feasible now because of strength or geometry limitations.

Preferred embodiments of the invention include the following features. The end portions of the screen basket may be attached with fasteners to a pair of stationary support members in the screening apparatus so that the screen basket is not subjected to axial compressive loads. The screen basket is fastened to the support members so that the axial mounting length of the screen basket is less than the axial distance between the mounting surfaces of the pair of support members. With this arrangement, fasteners provided at each mount secure the screen basket within the apparatus by applying an axially tensioned load to the screen basket. End rings are provided to end portions of the screen basket. Fasteners for attaching the end rings to a stationary support include bolts and pins. The end rings and support structure may include complementary tapered surfaces for preventing the screen basket from rotating and for sealing both ends of the screen basket. As an alternative to axially tensioned loading, the screen basket can be axially loaded in a neutral condition. The screen basket may be cylindrically or conically shaped.

DESCRIPTION OF THE PREFERRED EMBODIMENTS

Figure 1:
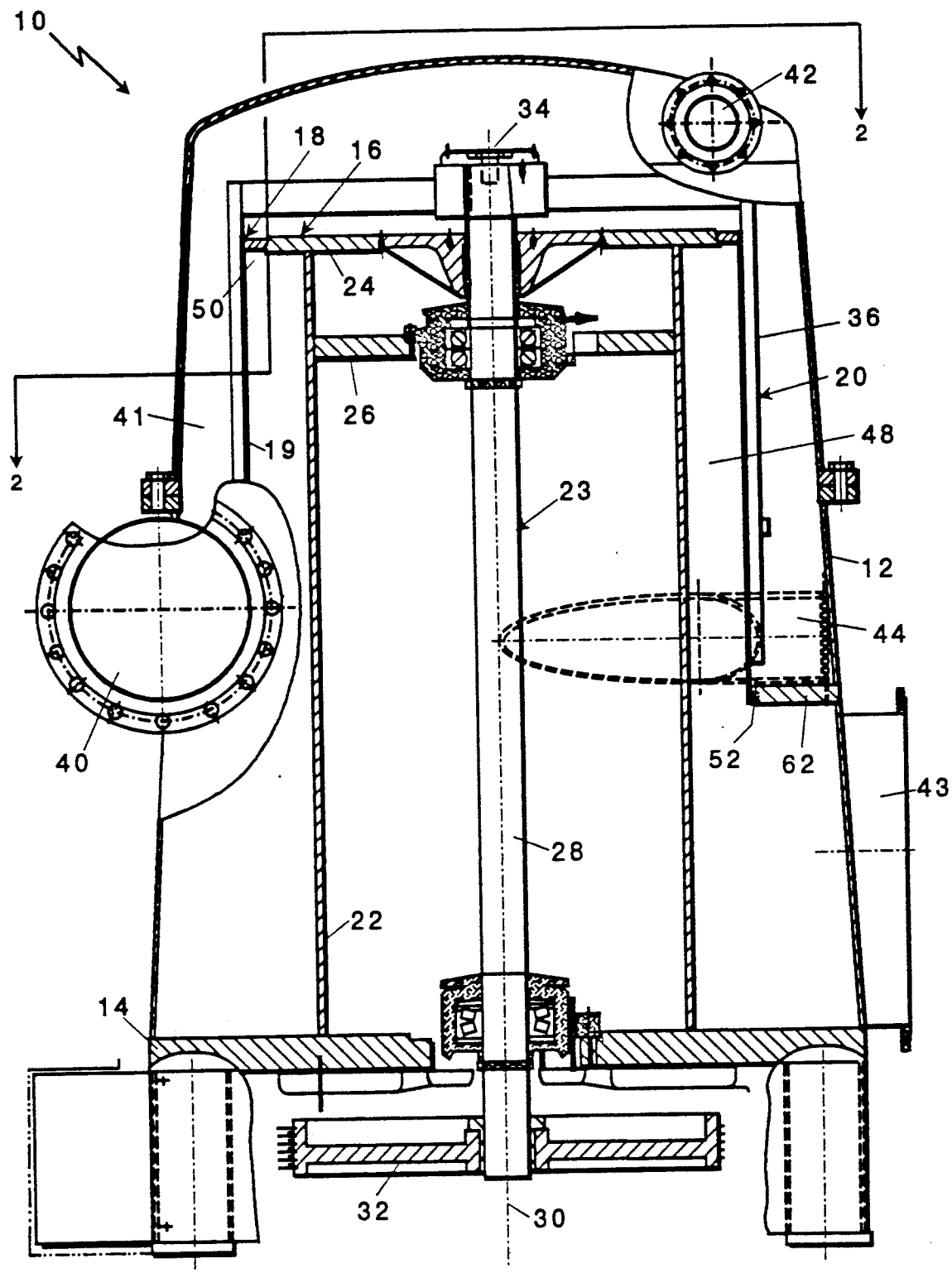
FIG. 1 is a cross-sectional side view of a screen apparatus having a screen basket mounted according to the invention.
Figure 2:
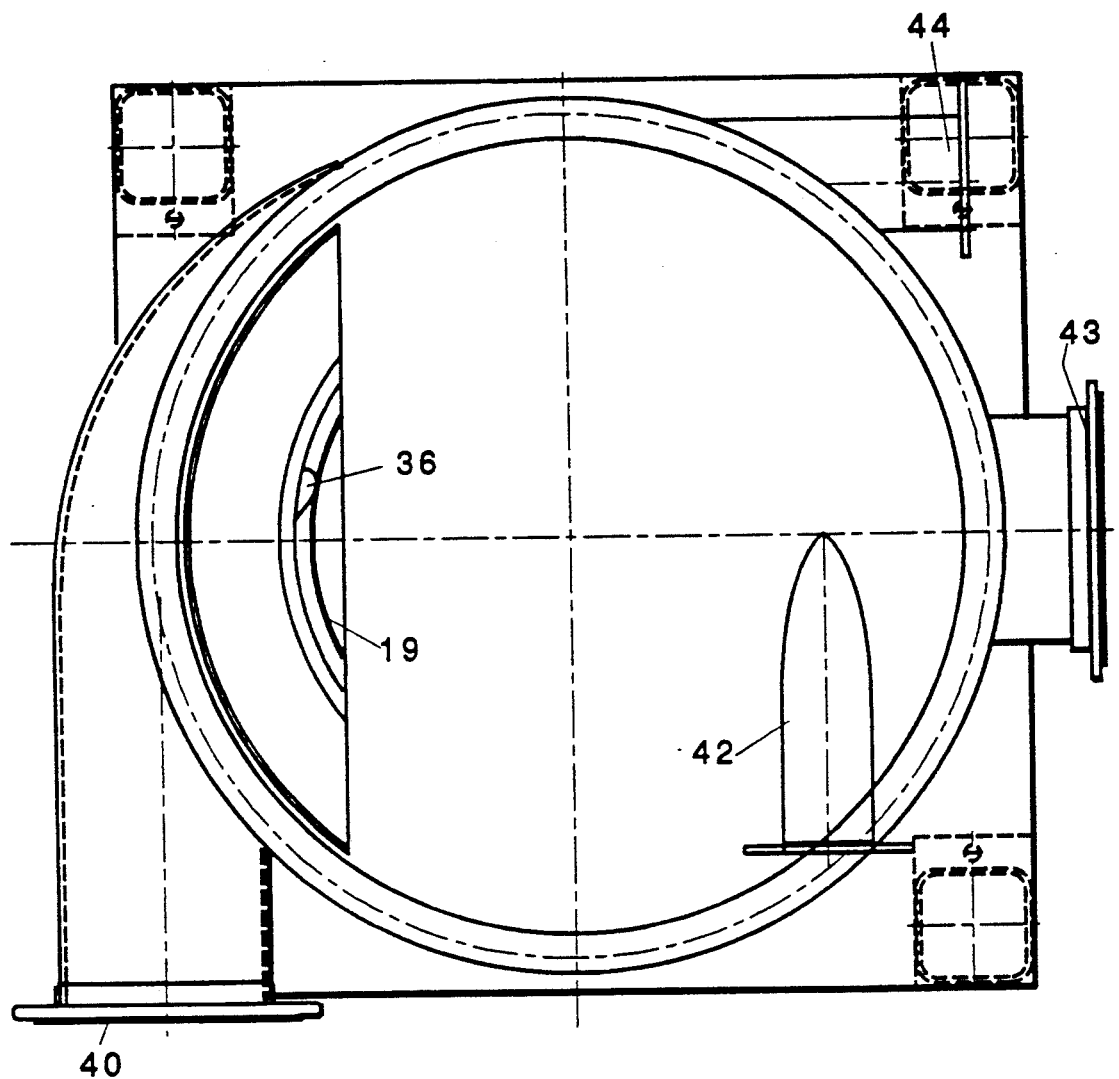
FIG. 2 is a cross-sectional top view of a portion of the screen apparatus taken along lines 2—2 of FIG. 1.

Referring to FIGS. 1 and 2, a screen apparatus 10 is shown having a housing 12 mounted on a base plate 14. Within housing 12 is a rigid support structure 16 for supporting a screen basket assembly 18 and supporting a rotor assembly 20. Support structure 16 includes a cylindrical drum 22 rigidly attached to base plate 14 at the bottom portion of screen basket apparatus 10, a top plate 24 for sealing the top portion of drum 22, and a center plate 26 attached to the inner surface of drum 22. Shaft assembly 23 includes a shaft 28 extending through base plate 14 and top plate 24 along a longitudinal axis 30 of housing 12 and support structure 16. To shaft 28 at a bottom end is secured a grooved pulley 32 which is driven by a belt coupled to a drive motor (not shown). A hub 34 is attached to the top end of shaft 28 and extends radially outward to a point where hydrofoils 36 extend down along and in close proximity to the outer surface of screen basket assembly 18. One example of a hydrofoil used to clear openings in a screen basket is described in U.S. Pat. No. 5,078,878, entitled "Pressure Knotter Screening Apparatus" assigned to the present assignee, and incorporated herein by reference.

In operation, fluid pulp is introduced under pressure to a fluid chamber 41 of screen apparatus 10 through a feed inlet 40 positioned along the outer periphery of housing 12 such that the fluid pulp circulates along the outer radial portion of housing 12. A spinning action is placed on the circulating fluid pulp by the cylindrical shape of housing 12 and by the rotational motion of rotor assembly 20 which moves in the same direction as the entering fluid pulp. The spinning action causes a separation of material due to their specific gravity such that lighter material gravitates toward longitudinal axis 30 and heavier materials collect along the outer radial portion of housing 12. Lighter materials that are desired to be removed from apparatus 10 exit through light reject outlet 42 positioned at an upper and outer portion of housing 12. On the other hand, heavier materials are removed through a heavy reject outlet 44 located at a lower and outer portion of housing 12. Acceptable fluid pulp that has been screened is removed from apparatus 10 through accept chamber 48 and accept outlet 43 for further processing (FIG. 2).

Figure 3:
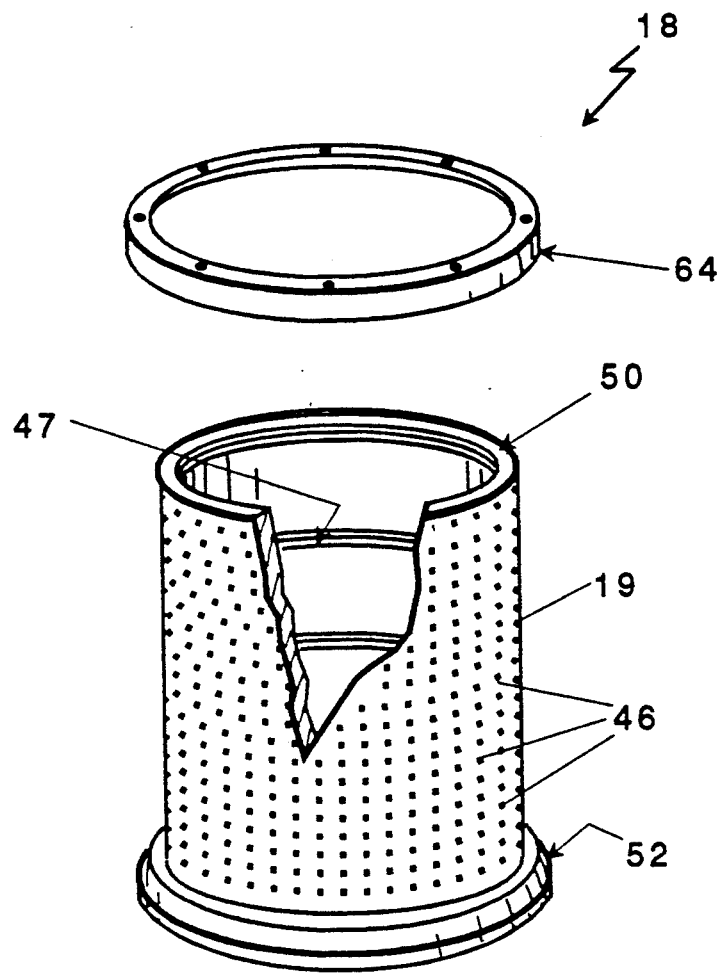
FIG. 3 is a diagrammatic view of one embodiment of a screen basket of the screen apparatus of FIGS. 1 and 2.

Referring to FIG. 3, screen basket assembly 18 includes a screen basket 19, fabricated from material having a thin wall thickness relative to its diameter and a number of openings 46 sized to screen out unwanted foreign material. Openings 46 are often blocked by feed slurry material of size approximate to that of openings 46. The feed slurry material must be removed to permit acceptable material to pass through to a screening chamber 48. A pair of end rings 50, 52 which are secured to top and bottom surfaces of screen basket 19, respectively and a clamping ring 64 are used for mounting screen basket assembly 18 to support structure 16 and to a device plate member 62 (FIG. 1). As an alternative to clamping ring 64, other means for attaching screen basket to support structure 16, such as a bayonet mount arrangement or threaded studs may be provided to either or both of end rings 50, 52. Reinforcing rings 47 are shown attached to and spaced along the inner surface of screen basket 19 to provide mechanical support to the relatively thin screen 19.

Referring again to FIGS. 1 and 2, hydrofoils 36 are spaced in close proximity to screen 19 such that, in operation, they provide localized turbulence and suction to force the blocking material out of openings 46 so that they may find their way to heavy reject outlet 44 or light reject outlet 42.

Screen basket assembly 18 is shown having a top end mounted to top plate 24 of support structure 16 and at a bottom end to device plate member 62 (only one side shown). Screen basket assembly 18 is mounted within screen apparatus 10 so that screen basket 19 is not subjected to axial compressive forces and simultaneously prevents screen basket assembly 18 from rotating about axis 30 in response to the torsional forces of the entering fluid pulp and rotating hydrofoils 36.

Figure 4:
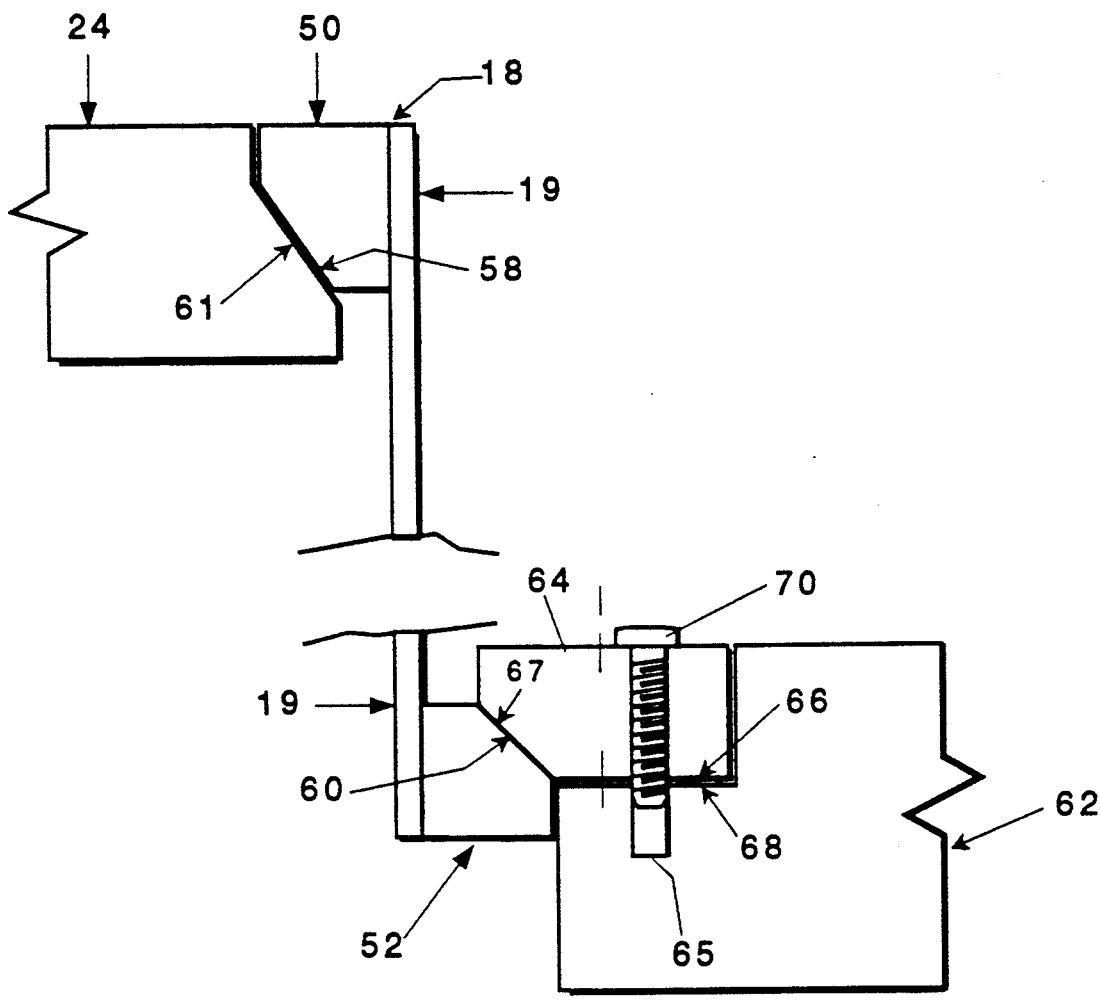
FIG. 4 is a diagrammatic view of the screen basket mounting arrangement of FIG. 1.

As shown in FIG. 4, top plate 24 has a tapered sidewall 61 along its outer periphery for receiving a mating outer tapered surface 58 of top end ring 50 that is secured to an inner wall of screen basket 19. Bottom end ring 52, secured to an outer wall of screen basket 19, similarly has an outer tapered surface 60 which extends to engage a corresponding tapered surface 67 of a clamping ring 64. It is appreciated that the end rings 50, 52 may be mounted on opposite surfaces of screen basket 19. In other words, top end ring 50 and bottom end ring 52 may, alternatively, be mounted to the outer and inner wall of screen basket 19 respectively. The engagement of tapered surfaces 58, 60, 61, 67 provide centering about axis 30 and sealing of rings 50, 52. Clamping ring 64 also has a flat surface region 66 for connection to a corresponding flat surface 68 of device plate 62. Clamping ring 64 is fastened to plate member 62 using bolts 70 engaged into a bolt circle of tapped holes 65 disposed around the circumference of plate member 62. In this arrangement, the mounting length of screen basket assembly 18 is shorter than the distance between mating tapered surface 61 at top plate 24 and flat surface region 68 of device plate 62. That is, with screen basket assembly 18 properly situated onto support structure 16, flat surface region 66 of clamping ring 64 is spaced from flat surface 68 of device plate 62 by a small distance. Bolts 70 screwed within tapped holes 65 secures screen basket assembly 18 to device plate 62 and places an axial tensile load on screen basket 19 and also provides resistance to any torsional forces. The axial tension of screen basket assembly 18 provides sufficient friction at the tapered surfaces of top and bottom end rings 50, 52 to prevent rotation of screen basket assembly 18 under the influence of the torsional forces of rotating hydrofoils 36.

Figure 5:
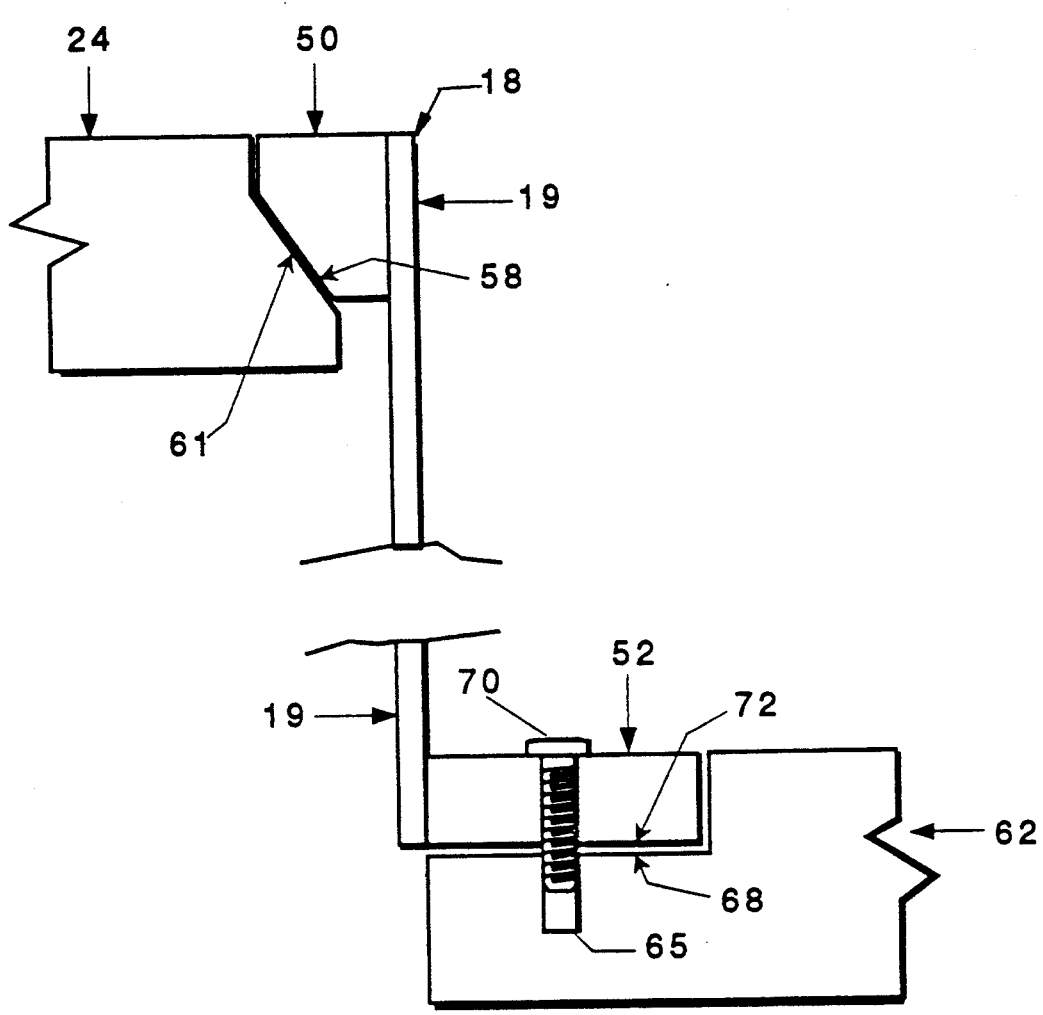
FIGS. 5-11 are diagrammatic views of other embodiments of screen basket mounting arrangements.

Other embodiments are within the scope of the claims. For example, as shown in FIG. 5, bottom end ring 52 does not have an outer tapered surface but has a flat surface 72 for being directly bolted to flat surface 68 of device plate 62 thereby placing screen basket assembly 18 in an axial tensioned condition without the need for a clamping ring.

Figure 6:
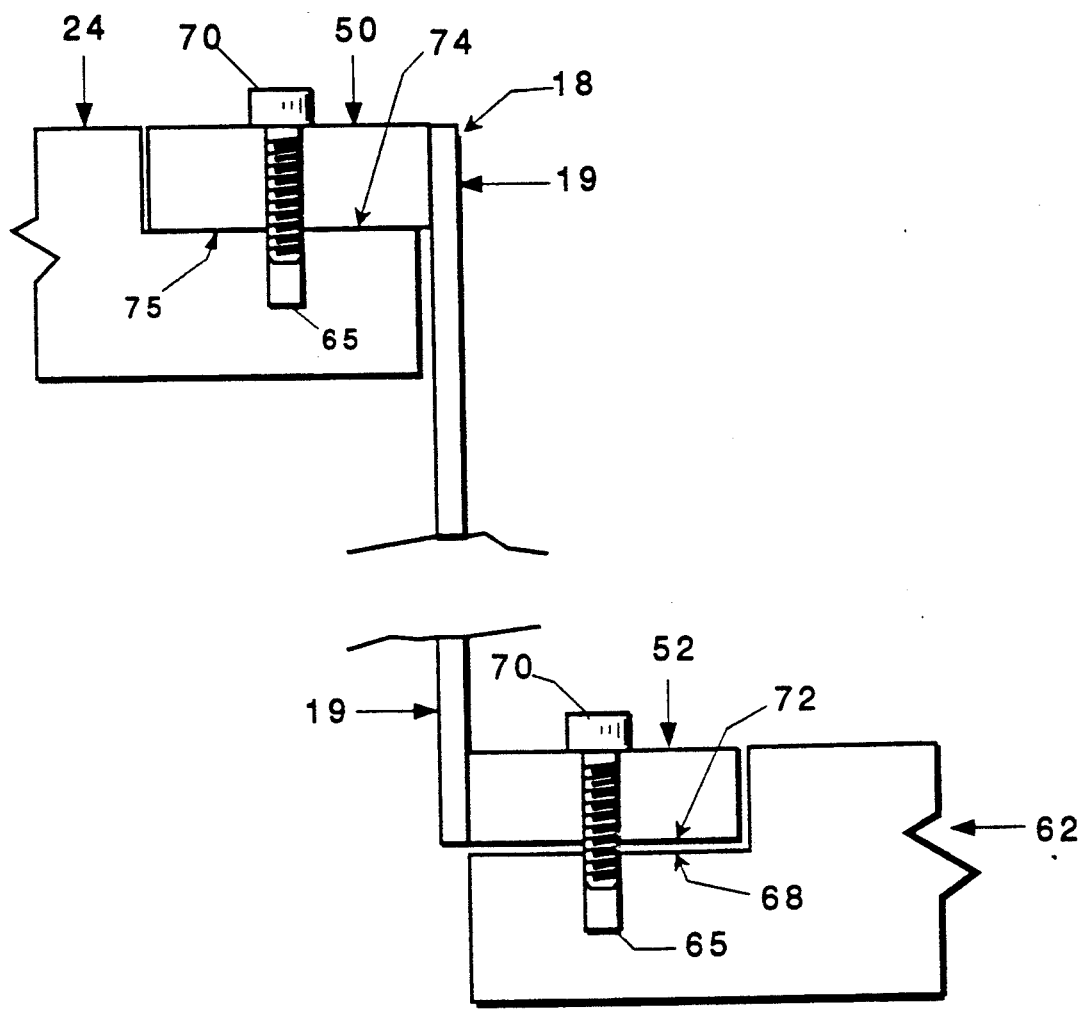
Figure 7:
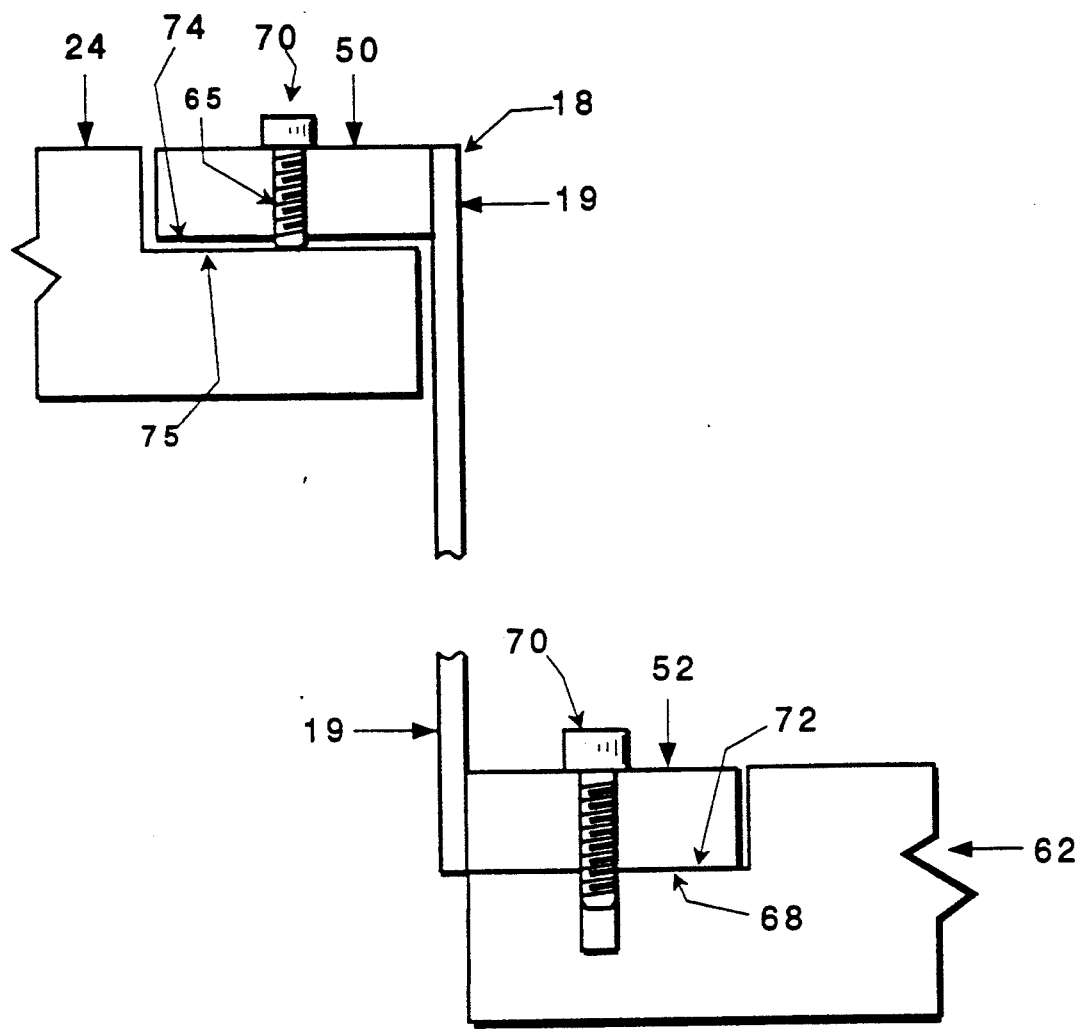

Similarly, referring to FIG. 6, in another tensioning arrangement, the tapered surface 58 of top end ring 50 (see FIG. 5) is replaced with a flat surface 74 that is directly fastened with bolts 70 to top plate 24 which also has a flat surface 75. As shown in FIG. 7, this mounting arrangement can be used with a screen basket assembly having a length greater than the distance between mating flat surface 75 at top plate 24 and flat surface region 68 of device plate 62 by eliminating tapped hole in top plate 24 and placing tapped holes 65 in top ring 50. In this way, bolts 70 are screwed into tapped holes 65 in end plate 50 until bolts 70 contact flat surface 75 of top plate 24. Continued rotation of bolt 70 provides an upward force to end ring 50 thereby providing an axial tension on screen basket assembly 18.

Figure 8:
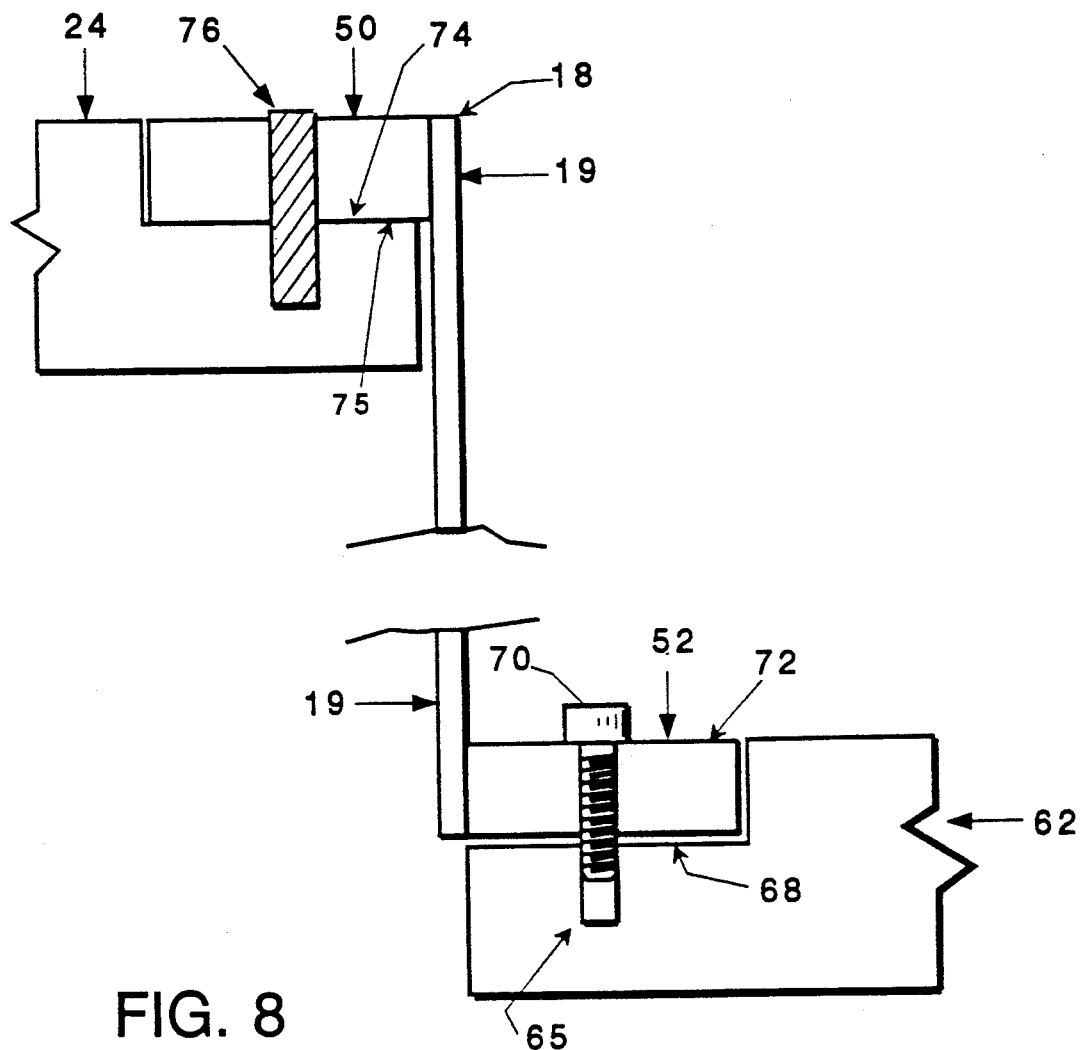

Other screen engagement elements or fasteners for securing end rings 50, 52 to top plate 24 and device plate 62 are possible. For example, as shown in FIG. 8, locating pins 76 are substituted for bolts 70 to secure top end ring 50 to top plate 24 with bottom end ring 52 remaining bolted to device plate 62. In all of the above arrangements, the fasteners (e.g. bolts 70) for placing the screen basket 19 in tension have been disposed internal to housing 12. However, it is appreciated that in some applications, such fasteners may be located external to housing 12 so that the screen basket may be tensioned after the screening apparatus is assembled.

Figure 9:
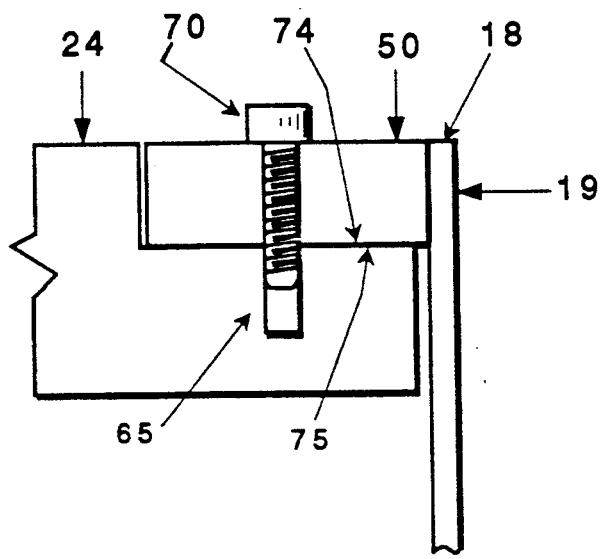
Figure 9:
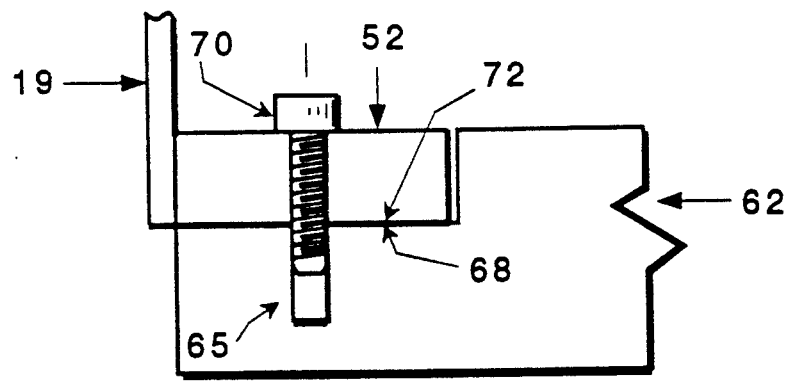

Besides placing screen basket assembly 18 under tension, a neutral loading is also beneficial. As shown in FIG. 9, attaching screen basket end rings 50, 52 to plate members 24, 62 respectively with bolts 70 will provide a neutral clamping load if the mounting length of screen basket assembly 18 is equal to the distance between mating surface 75 at top plate 24 and mating surface 68 at bottom plate 62. Bolts 70 fix screen basket assembly 18 at top plate 24 and bottom plate 62 such that screen basket assembly 18 can resist the torsional forces of the entering pulp fluid and of hydrofoils 36.

Figure 10:
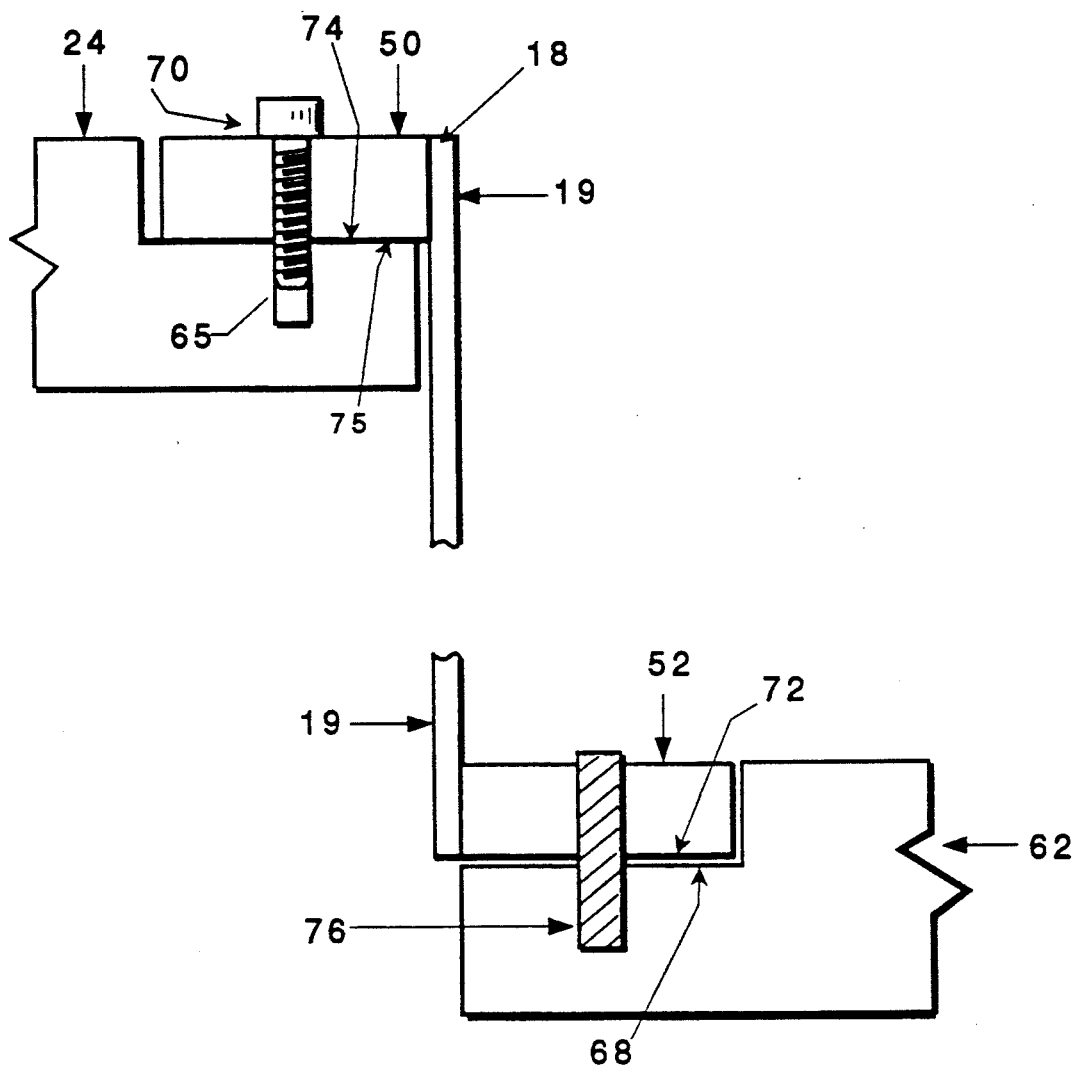
Figure 11:
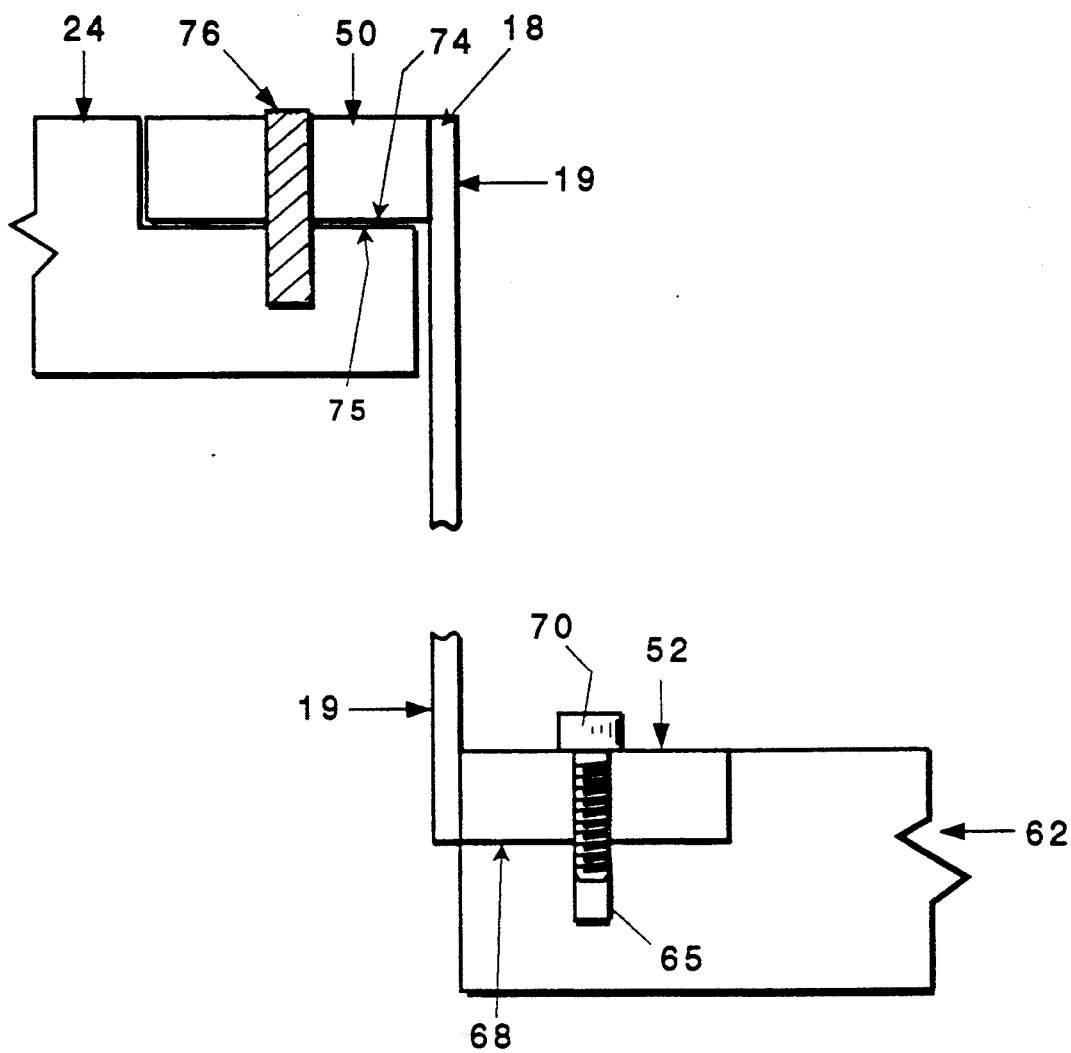

FIGS. 10 and 11 show arrangements whereby a neutral clamping load is achieved without the length of screen basket assembly 18 being equal to the distance between the mating surfaces of the top and bottom plates. FIG. 10 shows an arrangement whereby the screen basket mounting length is shorter than the distance between surface 75 of top plate member 24 and surface 68 of bottom plate member 62. Bolts 70 fix top ring 50 of screen basket assembly 18 to top plate 24 and pins 76 fix bottom ring 52 of screen basket assembly 18 to bottom plate 62 such that screen basket assembly 18 can resist the torsional forces of the entering pulp fluid and of hydrofoils 36. FIG. 11 shows an arrangement whereby the screen basket mounting length is greater than the distance between surface 75 of top plate member 24 and surface 68 of bottom plate member 62. Bolts 70 fix bottom ring 52 of screen basket assembly 18 to bottom plate 62 and pins 76 to fix top ring 50 of screen basket assembly 18 to top plate 24 such that screen basket assembly 18 can resist the torsional forces of the entering pulp fluid and of hydrofoils 36.

Other embodiments of screen basket assembly 18 are within the scope of the claims. Screen basket 19 is shown in the figures as cylindrical in form, but it may be in other shapes; for example, conically shaped.

What is claimed is:

1. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members and end portions being configured so that said screen basket has no substantial compressive loading, wherein the screen basket being attached to the pair of support members with the screen basket position engagement elements is not subjected to axial compressive loads, and wherein the screen basket being disposed in the pair if support members places the screen basket in an axially tensioned condition.

2. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein the screen basket being attached to the pair of support members with the screen basket position engagement elements is not subjected to axial compressive loads, wherein the screen basket being attached to the support members is axially loaded in a neutral condition, and wherein the axial length of the screen basket is not equal to the axial distance between the pair of support members.

3. A screening apparatus for removing rejectable material from a pressurized stream of fluid pulp, the screening apparatus comprising:

a housing for receiving the pressurized stream of fluid;

a screen basket having openings sized to reject the rejectable material travelling in the pressurized screen apparatus;

a rotor disposed concentrically with respect to the screen basket, the rotor carrying on one surface one or ore pulsing elements in close proximity to the screen basket, for clearing the openings of the rejectable material;

a pair of support members each support member secured to an opposite end portion of the screen basket; and the attachment between the support members and the end portions placing the screen basket in axial tension.

4. The screening apparatus of claim 3 wherein a first one of the support members has a bolt secured to a first end portion of the screen basket.

5. The screening apparatus of claim 4 wherein a second one of the support members has a fastener contacting a surface of a second end portion of the screen basket so that application of a downward force to the fastener causes a second end portion of the screen basket to move toward a second one of the support members.

6. The screening apparatus of claim 5 wherein the fastener is a bolt engaged within a threaded hole of the second one of the support members.

7. The screening apparatus of claim 4 wherein a first one of the support members has a tapered portion for mating with a complementary tapered portion of a first end portion of the screen basket.

8. The screening apparatus of claim 4 wherein a second one of the support members has a tapered portion for mating with a complementary tapered portion of a second end portion of the screen basket.

9. The screening apparatus of claim 4 wherein a second one of the support members has a pin disposed within a mating hole of a second end portion of the screen basket.

10. The screening apparatus of claim 4 wherein a second one of the support members is bolted to a second end portion of the screen basket.

11. The screening apparatus of claim 4 wherein a second end portion of the screen basket has a fastener contacting a surface of a second one of the support members so that application of a downward force to the fastener causes a second end portion of the screen basket to move away from a second one of the support members.

12. The screening apparatus of claims 3 further comprising end rings attached to each end portion of the screen basket.

13. The screening apparatus of claim 3 wherein the screen basket is cylindrical in shape.

14. The screening apparatus of claims 3 wherein the screen basket is conical in shape.

15. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, said screening apparatus further comprising end rings attached to each end portion of the screen basket.

16. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, and wherein a first one of the support members has a tapered portion for mating with a complementary tapered portion of a first end portion of the screen basket.

17. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, and wherein a second one of the support members has a tapered portion for mating with a complementary tapered portion of a second end portion of the screen basket.

18. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, wherein a second one of the support members has a pin disposed within a mating hole of a second end portion of the screen basket.

19. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, and wherein a second one of the support members is bolted to a second end portion of the screen basket.

20. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, and wherein a second one of the support members has a fastener contacting a surface of a second end portion of the screen basket so that application of a downward force to the fastener causes a second end portion of the screen basket to move toward a second one of the support members.

21. A screening apparatus for separating acceptable and rejectable material from a pressurized stream of fluid pulp, the screening apparatus comprising:

a housing for receiving the pressurized stream of fluid;

a screen basket having openings sized to separate the acceptable and rejectable material traveling in the pressurized stream;

a rotor disposed concentrically with respect to the screen basket, the rotor carrying on one surface one or more pulsing elements in close proximity to the screen basket, for clearing the openings of the rejectable material;

a pair of support members rigidly secured to the housing;

screen basket position engagement elements attaching each of the support members to an opposite end portion of the screen basket, said engagement elements, support members, and end portions being configured so that said screen basket has no substantial compressive loading, wherein a first one of the support members has a bolt secured to a first end portion of the screen basket, and wherein a second end portion of the screen basket has a fastener contacting a surface of a second one of the support members so that application of a downward force to the fastener causes a second end portion of the screen basket to move away from a second one of the support members.

* * * * *